United States Patent [19]

Toste, Jr. et al.

[11] Patent Number: 4,591,046
[45] Date of Patent: May 27, 1986

[54] TURNTABLE TRANSFER MECHANISM FOR CONVEYORS

[75] Inventors: Edward N. Toste, Jr., Cromwell; Daniel Clifford, Oakdale, both of Conn.

[73] Assignee: R. R. Donnelley & Sons Company, Chicago, Ill.

[21] Appl. No.: 700,054

[22] Filed: Feb. 8, 1985

Related U.S. Application Data

[63] Continuation of Ser. No. 481,916, Apr. 4, 1983, abandoned.

[51] Int. Cl.$^4$ .............................................. B65G 47/26
[52] U.S. Cl. ................................... 198/457; 198/613; 198/803.9; 271/225
[58] Field of Search ............... 198/612, 613, 457, 696, 198/803.9; 271/184, 185, 225, 277

[56] References Cited

U.S. PATENT DOCUMENTS

| | | |
|---|---|---|
| 1,524,641 | 1/1925 | Mayers . |
| 2,362,132 | 11/1944 | Haub . |
| 2,363,920 | 11/1944 | Young et al. ................... 198/457 X |
| 3,043,447 | 7/1962 | Lauck et al. . |
| 3,306,490 | 2/1967 | Ash et al. . |
| 3,575,276 | 4/1971 | Rupert ........................... 198/457 X |
| 4,160,500 | 7/1979 | Ver Mehren ...................... 198/457 |
| 4,437,560 | 3/1984 | Wolf ................................. 198/457 |

Primary Examiner—Jeffrey V. Nase
Attorney, Agent, or Firm—Wood, Dalton, Phillips Mason & Rowe

[57] ABSTRACT

A lugged chain conveyor system has two generally coplanar conveyor elements disposed at an angle to one another. A turntable which transfers articles from one conveyor to the other has several grippers equidistant from one another which are spring biased to open position, and a fixed cam rail cooperates with cam followers on the grippers to clamp articles onto the turntable as they leave one conveyor and release the articles when they are above the other conveyor.

11 Claims, 4 Drawing Figures

TURNTABLE TRANSFER MECHANISM FOR CONVEYORS

This application is a continuation of application Ser. No. 481,916, filed 4/4/83 now abandoned.

BACKGROUND OF THE INVENTION

There are a number of situations in which it is desirable to change the direction of travel of articles being carried upon a chain conveyor without changing the orientation of the articles in relation to the direction of travel—i.e., the leading end of the articles remains leading. Such handling is particularly necessary where the articles are periodicals being conveyed from a bindery line to a bundling and shipping point.

It has heretofore been recognized in the conveyor art that a turntable is admirably suited to the job of receiving articles from a discharge end of one conveyor and depositing them upon a receiving end of another conveyor which is in the same plane as the first conveyor but disposed at an angle to the first conveyor. Prior art patents showing such apparatus include Mayers U.S. Pat. No. 1,524,641, Haub U.S. Pat. No. 2,362,132, Lauck et al. U.S. Pat. No. 3,043,447, and Ash et al. U.S. Pat. No. 3,306,490. None of those patents discloses apparatus which is suitable for moving articles such as magazines from the discharge end of a first conveyor, around a corner to a receiving end of a second conveyor.

SUMMARY OF THE INVENTION

In accordance with the present invention, a chain conveyor system has lugged chains to carry articles the end portions of which project laterally outside the conveyor chains and has first and second generally coplanar conveyor elements disposed at an angle to one another so that an article must traverse a corner to pass from a discharge end of a first conveyor element to a receiving end of a second conveyor element. The system is provided with an article transfer mechanism consisting of a turntable which is driven about an axis in timed relationship to the rate of travel of the conveyors so that the peripheral speed of the turntable matches the linear speed of the conveyors, the axis of the turntable being on a line that bisects the angle between the conveyors, and the peripheral portion of the turntable underlying a projecting end portion of articles on the conveyors. A plurality of grippers are located equidistantly about the turntable in positions to clamp a projecting end portion of an article against the turntable, and means are provided for lowering and raising the grippers to clamp an article as it leaves the discharge end of the first conveyor element and release the article when it is above the receiving end of the second conveyor element.

In a preferred embodiment of the invention the means for operating the grippers comprises a fixed arcuate cam rail which is above the turntable and concentric with the arc traversed by the grippers between the discharge end of the first conveyor and the receiving end of the second conveyor, and there is a cam follower on each gripper which rides along the cam rail to lower and raise the gripper.

In a most preferred embodiment the cam rail comprises two overlapping rail members which are slidable endwise with respect to one another so the length of the cam rail may be adjusted. The cam rail has a gently curved camming entry surface so gripping force is applied gently to an article leaving the first conveyor element, and the rail has a sharply curved camming exit surface to quickly release the article to be received by the second conveyor element.

THE DRAWINGS

DETAILED DESCRIPTION OF THE INVENTION

Figure 1:
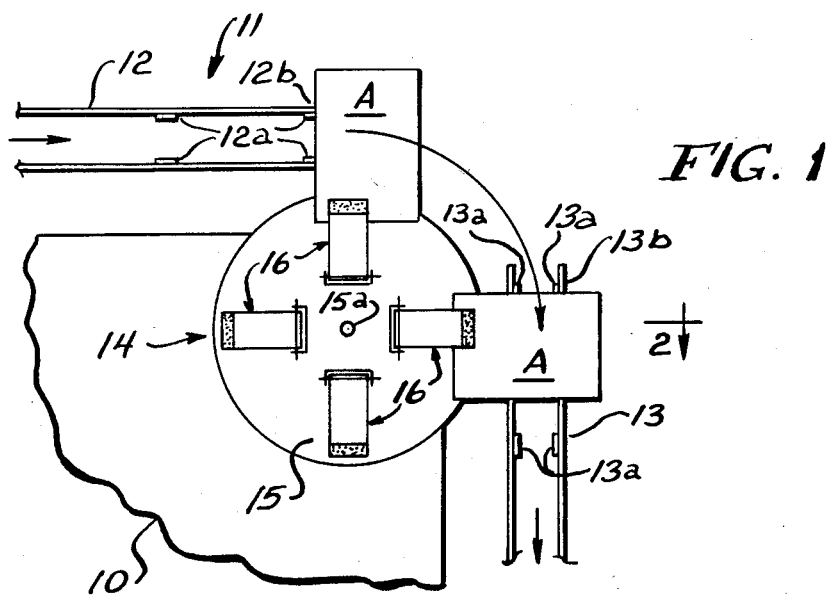
FIG. 1 is a schematic plan view of a lugged chain conveyor system provided with the article transfer mechanism of the present invention with the cam rail omitted.

Referring to the drawings in detail, a base, indicated generally at 10, supports a lugged conveyor chain system, indicated generally at 11, that includes a first conveyor element 12 and a second conveyor element 13, each of which consists of a pair of parallel conveyor chains provided with respective lugs 12a and 13a which move articles A positively along the conveyor system. Because of the angular relationship between the first conveyor element 12 and the second conveyor element 13, each of the articles A must traverse a corner to pass from a discharge end 12b of the first conveyor element 12 to a receiving end 13b of the second conveyor element 13. The articles A have end portions which project laterally outside the conveyor chains.

An article transfer mechanism, indicated generally at 14, includes a turntable 15 which is driven about an axis 15a in timed relationship to the rate of travel of the conveyor elements so that the peripheral speed of the turntable matches the linear speed of the conveyor elements. The axis of the turntable is on a line that bisects the angle between the conveyor elements, and the peripheral portion of the turntable underlies a projecting end portion of each of the articles A on the conveyor elements.

On the turntable are four grippers, indicated generally at 16, which are located equidistantly about the turntable in positions to clamp a projecting end portion of an article A against the turntable 15.

Figure 2:
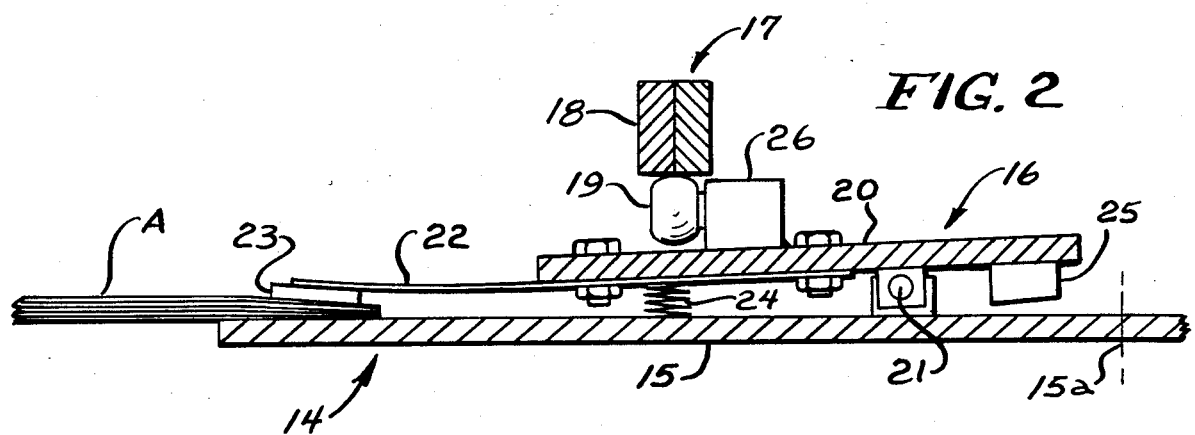
FIG. 2 is a sectional view on an enlarged scale taken substantially as indicated along the line 2—2 of FIG. 1 with the cam rail in position.

As best seen in FIG. 2, each of the grippers 16 comprises a rigid arm 20 which has a pivot 21 intermediate its ends by means of which it is pivotally mounted upon the turntable 15. At the outer end of the gripper arm 20 is a wide resilient spring steel plate 22 upon the underside of which is a gripping pad 23. A compression spring 24 is mounted upon the turntable 15 beneath the gripper arm 20 to bias the gripper toward a raised position (not illustrated) in which the gripping pad 23 is a substantial distance above the plane of the top surface of articles A upon the conveyor elements 12 and 13. The part of the arm 20 which is to the opposite side of the pivot 21 from the resilient plate 22 is provided with a resilient damper 25. Surmounting the arm 20 is a block 26 upon which the cam follower 19 is rotatably mounted.

Figure 3:
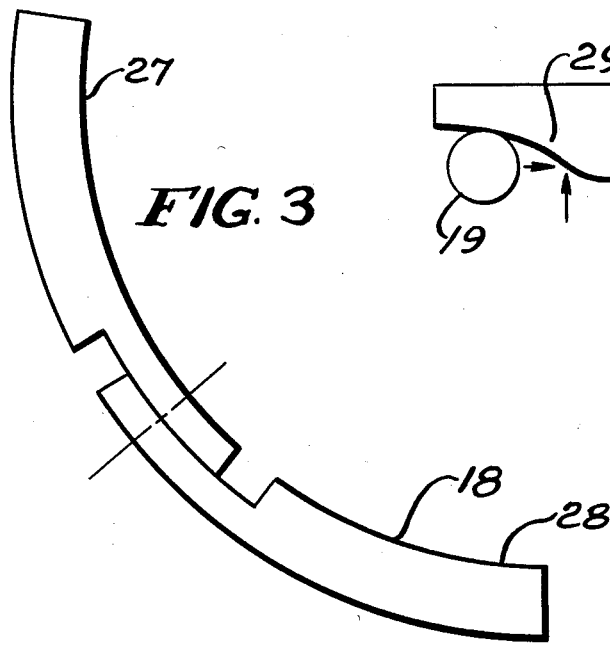
FIG. 3 is a plan view of the cam rail.

The cam rail 18 is seen in FIG. 3 to be arcuate, and it occupies a fixed position above the turntable and concentric with the arc traversed by the resilient plate 22 and gripping pad 23 as they traverse the space between the discharge end 12b of the first conveyor element 12 and the receiving end 13b of the second conveyor element 13. The cam rail comprises two overlapping rail members 27 and 28 which are slidable endwise with respect to one another so the length of the cam rail may be adjusted.

Figure 4:
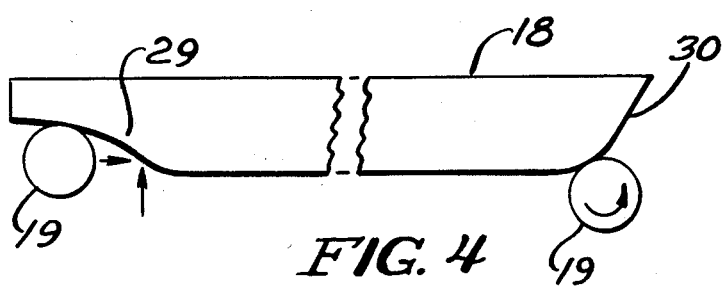
FIG. 4 is a fragmentary elevational view of the cam rail illustrating the camming entry surface and the camming exit surface.

The cam rail is seen in FIG. 4 to have a gently curved camming entry surface 29 which is adjacent the discharge end 12b of the first conveyor element 12, and a sharply curved camming exit surface 30 which is adjacent the receiving end 13b of the second conveyor element 13. Thus, each of the grippers 16 applies gripping force gently to an article leaving the first conveyor element and quickly releases the article to be received by the second conveyor element.

The foregoing detailed description is given for clearness of understanding only and no unnecessary limitations should be understood therefrom, as modifications will be obvious to those skilled in the art.

We claim:

1. In a lugged chain conveyor system for articles the end portions of which project laterally outside the conveyor chains and which has first and second generally coplanar conveyor elements disposed at an angle to one another, so an article must traverse a corner to pass from a discharge end of the first conveyor element to a receiving end of the second conveyor element, an article transfer mechanism comprising, in combination:

a turntable which is driven about an axis in timed relationship to the rate of travel of the conveyor elements so that the peripheral speed of the turntable matches the linear speed of the conveyor elements, the axis of the turntable being on a line that bisects the angle between the conveyor elements, and the peripheral portion of the turntable underlying a projecting end portion of each article on the conveyor elements;

a plurality of grippers located equidistantly about the turntable in positions to clamp a projecting end portion of an article against the turntable, each gripper being an arm mounted on the turntable on a pivot which is intermediate its ends, and being pivotable between a clamping mode and a release mode;

a compression spring between each said pivot and the gripping end of an arm to bias the arm toward release position;

a resilient damper underlying a part of each arm which is at the opposite side of the pivot from the compression spring;

and means for lowering and raising said grippers to clamp an article as it leaves the discharge end of the first conveyor element and release said article when it is above the receiving end of the second conveyor element.

2. The combination of claim 1 in which the means for lowering and raising the grippers comprises a fixed arcuate cam rail which is above the turntable and concentric with the arc traversed by the grippers between the discharge end of the first conveyor element and the receiving end of the second conveyor element and a cam follower on each gripper which rides along the cam rail to lower and raise the gripper.

3. The combination of claim 2 in which the cam rail has a gently curved camming entry surface adjacent the discharge end of the first conveyor element and a sharply curved camming exit surface adjacent the receiving end of the second conveyor element, whereby each gripper applies gripping force gently to an article leaving the first conveyor element and quickly releases the article to be received by the second conveyor element.

4. The combination of claim 3 in which the cam rail comprises two overlapping rail members which are slidable endwise with respect to one another, so the length of the cam rail may be adjusted.

5. The combination of claim 1 in which the gripper includes a resilient plate at the gripping end, and a gripping pad on the underside of said plate.

6. The combination of claim 1 in which the articles are sufficiently rigid that most of each article is free of support as the article is moved by the turntable.

7. In a lugged chain conveyor system for broad, flat, generally rigid articles the end portions of which project laterally outside the conveyor chains and which as first and second generally coplanar conveyor elements disposed at an angle to one another, so an article must traverse a corner to pass from a discharge end of the first conveyor element to a receiving end of the second conveyor element, an article transfer mechanism comprising, in combination:

a turntable which is driven about an axis in timed relationship to the rate of travel of the conveyor elements so that the peripheral speed of the turntable matches the linear speed of the conveyor elements, the axis of the turntable being on a line that bisects the angle between the conveyor elements, the turntable having an upper surface at least the peripheral portion of which is entirely planar, and said peripheral portion of the turntable underlying a projecting end portion of each article on the conveyor elements;

a plurality of pivots located equidistantly about the upper surface of the turntable, said pivots being in a plane above and parallel to the planar portion of the turntable;

a plurality of grippers each of which comprises a rigid arm mounted on one of said pivots and a broad, resilient gripping plate at a distal end of said arm, and a gripping pad on the underside of each resilient gripping plate confronting the planar peripheral portion of the upper surface of the turntable;

means biasing said grippers about the pivots to a normal position in which their gripping end portions are in spaced relationship to the turntable and above the plane of the upper surfaces of said articles;

and means for lowering each of said grippers to clamp an article as it leaves the discharge end of the first conveyor element and to release said gripper from the clamped article when it is above the receiving end of the second conveyor element.

8. The combination of claim 7 in which the means for lowering the grippers comprises a fixed arcuate cam rail which is above the turntable and concentric with the arc traversed by the grippers between the discharge end of the first conveyor element and the receiving end of the second conveyor element and a cam follower on each gripper which rides along the cam rail to lower the gripper.

9. The combination of claim 8 in which the cam rail comprises two overlapping rail members which are slidable endwise with respect to one another, so the length of the cam rail may be adjusted.

10. The combination of claim 7 in which the means to lower each gripper and to release each gripper from the article comprises a fixed cam member which is above the turntable, said cam member having a gripper control surface that is concentric with the arc traversed by the end portion of each gripper between the discharge end of the first conveyor element and the receiving end of the second conveyor element, there being an arcuate camming entry surface at one end of said control surface and an arcuate camming exit surface at an opposite end of the control surface, and a cam follower on each gripper which travels along the cam member as the turntable rotates, travel of each cam follower over the camming entry surface lowering the gripper and travel of each cam follower over the camming exit surface releasing the gripper for return to its normal position by said biasing means.

11. The combination of claim 10 in which the camming entry surface is gently curved and the camming exit surface is sharply curved, whereby each gripper applies gripping force gently to an article leaving the first conveyor element and quickly releases the article to be received by the second conveyor element.

* * * * *